US010091441B1

(12) United States Patent
Northcott (10) Patent No.: US 10,091,441 B1
(45) Date of Patent: Oct. 2, 2018

(54) IMAGE CAPTURE AT MULTIPLE RESOLUTIONS

(71) Applicant: Malcolm J. Northcott, Santa Cruz, CA (US)

(72) Inventor: Malcolm J. Northcott, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 6 days.

(21) Appl. No.: 15/271,333

(22) Filed: Sep. 21, 2016

Related U.S. Application Data

(60) Provisional application No. 62/233,698, filed on Sep. 28, 2015.

(51) Int. Cl.
| H04N 5/343 | (2011.01) |
| H04N 5/347 | (2011.01) |
| H04N 5/76 | (2006.01) |
| H04N 7/08 | (2006.01) |

(52) U.S. Cl.
CPC ............ *H04N 5/343* (2013.01); *H04N 5/347* (2013.01); *H04N 5/76* (2013.01); *H04N 7/0803* (2013.01); *H04N 7/0806* (2013.01)

(58) Field of Classification Search
None
See application file for complete search history.

(56) References Cited

U.S. PATENT DOCUMENTS

| 5,262,871 | A | * | 11/1993 | Wilder | H01L 27/14609 |
| | | | | | 257/E27.132 |
| 5,285,286 | A | | 2/1994 | Kannegundla | |
| 6,455,831 | B1 | * | 9/2002 | Bandera | G06K 9/605 |
| | | | | | 250/208.1 |
| 6,839,452 | B1 | * | 1/2005 | Yang | H03F 3/082 |
| | | | | | 348/E3.02 |
| 7,408,572 | B2 | * | 8/2008 | Baxter | H04N 5/335 |
| | | | | | 348/169 |
| 7,450,165 | B2 | | 11/2008 | Ahiska | |
| 2005/0117017 | A1 | | 6/2005 | Baer | |
| 2005/0212913 | A1 | | 9/2005 | Richter | |
| 2007/0002131 | A1 | | 1/2007 | Ritchey | |
| 2009/0066782 | A1 | | 3/2009 | Choi et al. | |
| 2010/0289904 | A1 | | 11/2010 | Zhang et al. | |
| 2015/0163422 | A1 | | 6/2015 | Fan et al. | |
| 2015/0312461 | A1 | * | 10/2015 | Kim | H01L 27/14609 |
| | | | | | 348/308 |

FOREIGN PATENT DOCUMENTS

EP 0940029 A1 9/1999

* cited by examiner

*Primary Examiner* — James Hannett
(74) *Attorney, Agent, or Firm* — Young Basile Hanlon & MacFarlane, P.C.

(57) ABSTRACT

A method for capturing an image from an image sensor having a plurality of sensing elements includes receiving a first group of image signals from a first portion of the plurality of sensing elements using at least a first binned read mode; receiving a second group of image signals from a second portion of the plurality of sensing elements using a non-binned read mode; generating a first image based on at least the first group of image signals and the second group of image signals; and generating a second image based on the second group of image signals.

20 Claims, 5 Drawing Sheets

IMAGE CAPTURE AT MULTIPLE RESOLUTIONS

CROSS-REFERENCE TO RELATED APPLICATIONS

This application claims the benefit of U.S. Provisional Application No. 62/233,698, which was filed on Sep. 28, 2015, the content of which is hereby incorporated by reference in its entirety for all purposes.

FIELD

The disclosure relates generally to the field of imaging devices. More particularly, the disclosure relates to capturing images at multiple resolutions using an imaging device.

BACKGROUND

Still images and video sequences are utilized as inputs by a variety of computing applications. These applications often operate in real-time, by receiving inputs from an image sensor. The characteristics of the required input are application specific. Some applications require high frame rate video, while other applications require high-resolution images.

Known solid-state image sensors can be controlled to operate at various resolutions and framerates. Generally, there is an inverse relationship between frame rate and resolution. High frame rate modes typically operate at low to moderate resolutions, while high-resolution modes typically operate at low to moderate frame rates.

SUMMARY

One aspect of the disclosed embodiments is a method for capturing an image from an image sensor having a plurality of sensing element. The method includes receiving a first group of image signals from a first portion of the plurality of sensing elements using at least a first binned read mode and receiving a second group of image signals from a second portion of the plurality of sensing elements using a non-binned read mode. The method also includes generating a first image based on at least the first group of image signals and the second group of image signals and generating a second image based on the second group of image signals.

Another aspect of the disclosed embodiments is an apparatus that includes an image sensor having a plurality of sensing elements, a memory, and a control circuit that includes instructions, wherein the instructions, when executed, cause the control circuit to receive a first group of image signals from a first portion of the plurality of sensing elements using at least a first binned read mode, receive a second group of image signals from a second portion of the plurality of sensing elements using a non-binned read mode, generate a first image based on at least the first group of image signals and the second group of image signals, and generate a second image based on the second group of image signals.

Another aspect of the disclosed embodiments is a non-transitory computer-readable storage device including program instructions executable by one or more processors that, when executed, cause the one or more processors to perform operations. The operations include receiving a first group of image signals from a first portion of the plurality of sensing elements using at least a first binned read mode, receiving a second group of image signals from a second portion of the plurality of sensing elements using a non-binned read mode, generating a first image based on at least the first group of image signals and the second group of image signals, and generating a second image based on the second group of image signals.

Another aspect of the disclosed embodiments is a method for controlling an image sensor having a plurality of sensing elements. The method includes reading a first group of image signals from a first portion of the image sensor using a first binned read mode, reading a second group of image signals from a second portion of the image sensor using a second binned read mode, and reading a third group of image signals from a third portion of the image sensor using a non-binned read mode. The method also includes generating a first image based on at least the first group of image signals, the second group of image signals, and the third group of image signals, generating a second image based on the second group of image signals and the third group of image signals, and generating a third image based on the third group of image signals.

Another aspect of the disclosed embodiments is a method for controlling an image sensor having a plurality of sensing elements. The method includes obtaining a reference image using the image sensor, identifying a window of interest using the reference image based on presence of at least one feature, and identifying a first portion of the image sensor that does not include the window of interest and a second portion of the image sensor that includes the window of interest. The method also includes reading a first group of image signals from the first portion of the image sensor using at least a first binned read mode, and reading a second group of image signals from a second portion of the image sensor using a non-binned read mode. The method also includes generating a first image based on at least the first group of image signals and the second group of image signals by combining the first group of image signals with a downsampled version of the second group of image signals, and generating a second image that corresponds to the window of interest based on the second group of image signals.

Another aspect of the disclosed embodiments is an apparatus that includes an image sensor having a plurality of sensing elements, a first receiving unit to receive a first group of image signals from a first portion of the plurality of sensing elements using at least a first binned read mode, a second receiving unit to receive a second group of image signals from a second portion of the plurality of sensing elements using a non-binned read mode, a first generating unit to generate a first image based on at least the first group of image signals and the second group of image signals, and a second generating unit to generate a second image based on the second group of image signals.

BRIEF DESCRIPTION OF THE DRAWINGS

The detailed description makes reference to the accompanying drawings, wherein like reference numerals refer to like parts through several views, and in which.

DETAILED DESCRIPTION

In known systems, it is not practical for multiple applications to concurrently use a single image sensor to provide inputs when the applications require differing characteristics. The methods, systems, and devices described herein utilize a flexible read out scheme for an image sensor by which portions of an image sensor are read using differing read modes. For example, a first portion of an image sensor can be read using a first read mode, and a second portion of the image sensor can be read using a second read mode. The information read from the first portion of the image sensor can be combined with the information read from the second portion of the image sensor to generate a first output image, while a second output image is generated using at least part of the information read from the second portion of the image sensor.

Figure 1:
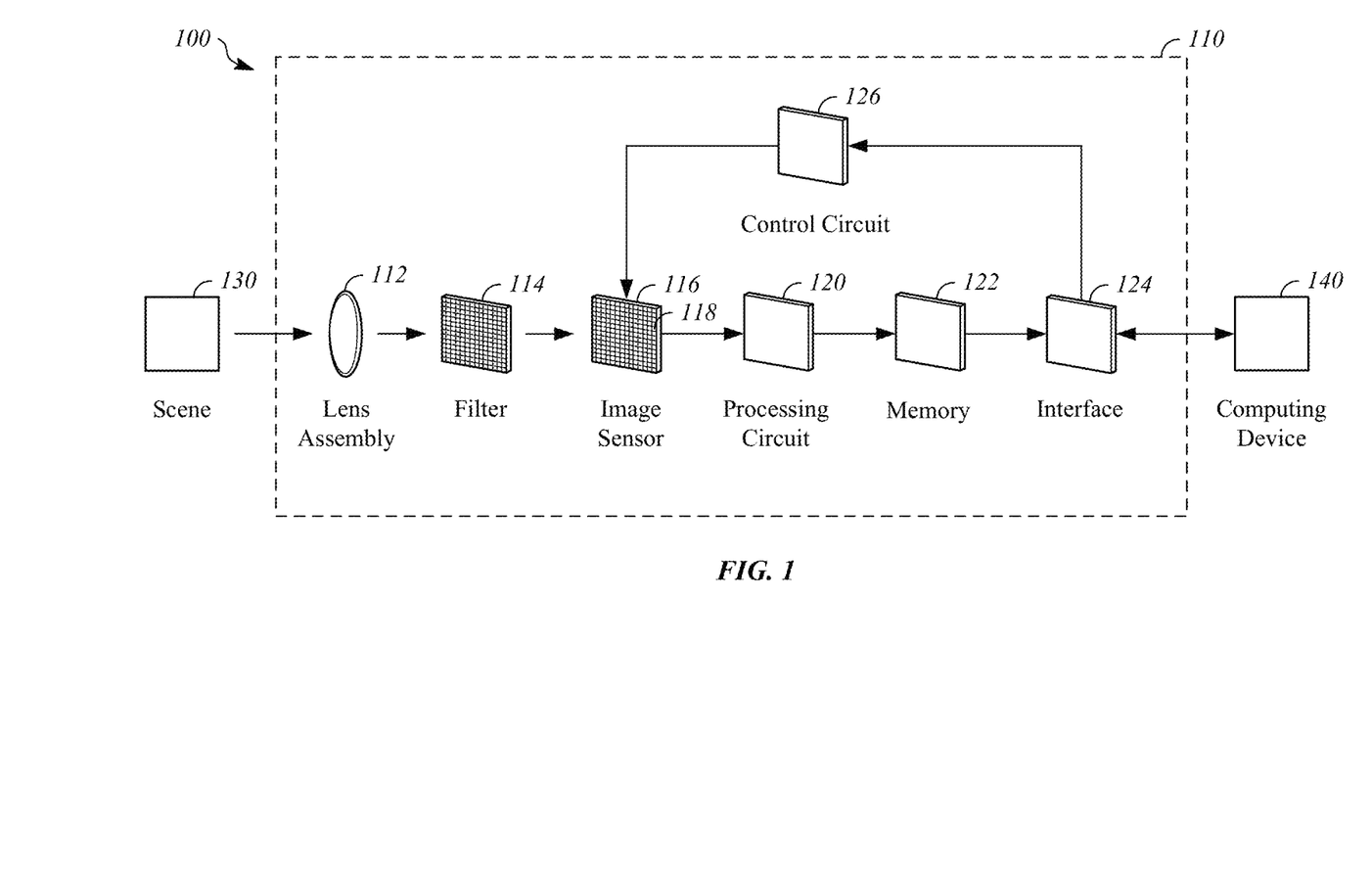
FIG. 1 is a block diagram showing an example of an imaging system.

FIG. 1 shows an imaging system 100 that includes an imaging device 110. The imaging device 110 is an example of a device that can be utilized to implement the systems and methods described herein. In the illustrated example, the imaging device 110 includes a lens assembly 112, a filter 114, an image sensor 116, a processing circuit 120, a memory 122, an interface 124, and a control circuit 126. It should be understood that these components are described by way of example, and that the systems and methods that are described herein can be implemented using imaging systems that differ from the imaging system 100.

The imaging device 110 receives electromagnetic radiation from a scene 130 and generates information representing an image based on the received electromagnetic radiation. The scene 130 includes any source of visible electromagnetic radiation or non-visible electromagnetic radiation in at least the infrared portion of the electromagnetic spectrum within the field of view of the imaging device 110. The output of the imaging device can be transmitted to an external device, such as a computing device 140. The computing device 140 can be any manner of device that is able to receive, interpret, display, and/or store the output of the imaging device 110. The computing device 140 may include instructions, whether encoded in hardware or stored in memory. As one example, the computing device 140 may include one or more processors and memory, such that the processor of the computing device 140 is operable to access information stored in the memory and execute program instructions stored in the memory. As another example, the computing device 140 can be or include one or more processors that are dedicated to the function of controlling the imaging device. As another example, the computing device may be a device such as a field-programmable gate array (FPGA) or an application-specific integrated circuit (ASIC) that includes encoded instructions for controlling the imaging device. As another example, the computing device 140 can be a conventional computer of any type.

The lens assembly 112 of the imaging device 110 includes one or more lenses. The lens assembly 112 receives and directs at least visible and infrared electromagnetic radiation. In typical implementations, the lens assembly includes a plurality of lens elements, some of which may be manipulated mechanically to allow focusing and/or zooming.

The electromagnetic radiation that passes through the lens assembly 112 next passes through the filter 114. The filter 114 is an element that controls the type of electromagnetic radiation that passes through it, by allowing passage of or blocking passage of electromagnetic radiation of particular wavelength ranges. In some implementations, the filter 114 is an array of filter elements that each allow or block passage of a different wavelength as compared to one or more neighboring filter elements in the array. As one example, if the imaging device 110 is intended to capture color images, the filter 114 can be a color filter array such as a Bayer filter. As another example, if the imaging device 110 is intended to capture infrared images, the filter 114 can be of a type that passes infrared radiation. As another example, if the imaging device 110 is intended to capture both visible images and infrared images, the filter 114 can include a pattern of filter elements including filter elements that pass certain wavelengths in the visible portion of the electromagnetic spectrum and filter elements that pass wavelengths in the infrared portion of the electromagnetic spectrum.

The image sensor 116 is a solid-state device that includes an array of sensing elements 118. Each of the sensing elements 118 is operable to accumulate an electrical charge proportional to the amount of electromagnetic radiation incident upon it. The charge of each sensing element 118 can be manipulated by the image sensor 116 to allow it to be amplified and read out as an analog image signal. As examples, the image sensor 116 can be a CCD image sensor or a CMOS image sensor. To control exposure of the sensing elements 118, the image sensor 116 can include a global shutter or a rolling shutter.

The processing circuit 120 is operable to receive the analog image signals and store information in the memory 122 that represents the analog image signals. The processing circuit 120 can include, as examples, an analog-to-digital converter and a digital signal processor. The interface 124 is operable to access information stored in the memory 122 and transmit the information to an external component, such as the computing device 150.

The interface 124 is also operable to receive information including instructions from the computing device 150, and relay the information and/or instructions to the control circuit 126. The control circuit 126 is operable to regulate operation of the image sensor 116, such as by setting a read mode for the image sensor 116 and controlling the manner in which the analog image signals are collected and/or read by the image sensor 116.

Figure 2:
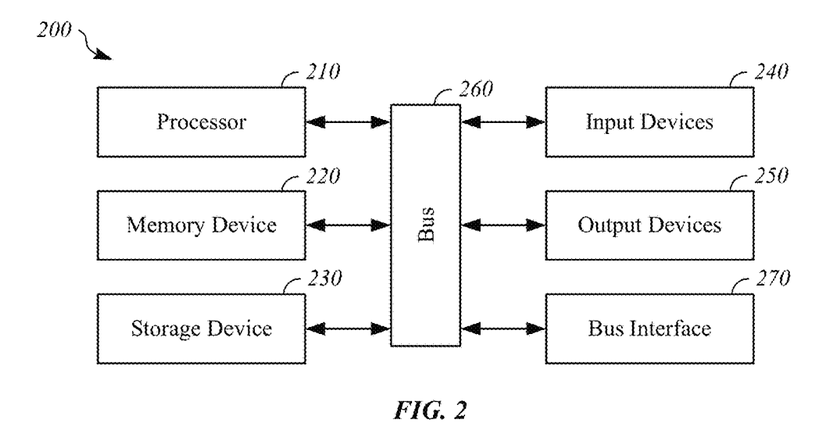
FIG. 2 is a block diagram showing an example of a computing device.

FIG. 2 shows an example of a computing device 200 that can be utilized as the computing device 150 of FIG. 1. The computing device 200 can be a single computing device, such as a desktop computer, a laptop computer, a tablet, or a mobile telephone. Alternatively, the computing device 200 can be a system that includes multiple computing devices working cooperatively.

In the illustrated example, the computing device 200 includes a processor 210, a memory device 220, a storage device 230, one or more input devices 240, and one or more output devices 250, which are interconnected by a bus 260. The computing device 200 can also include a bus interface 270 for connecting peripheral devices to the bus 260.

The processor 210 can be any type of device that is able to process or manipulate information, including devices that are currently known and devices that may be developed in the future. As an example, the processor 210 can be a conventional central processing unit (CPU). Although the illustrated example shows a single processor, multiple processors can be utilized instead of a single processor.

The memory device 220 is utilized to store information for immediate use by the processor 210. The memory device 220 includes either or both of a random access memory (RAM) device and a read only memory (ROM) device. The memory device 220 can be utilized to store information, such as program instructions that can be executed by the processor 210, and data that is stored by and retrieved by the processor 210. In addition, portions of the operating system of the computing device 200 and other applications that are being executed by the computing device 200 can be stored by the memory device during operation of the computing device 200.

The storage device 230 is utilized to store large amounts of data persistently. As examples, the storage device 230 can be a hard disk drive or a solid-state drive.

The input devices 240 can include any type of device that is operable to generate computer interpretable signals or data in response to user interaction with the computing device 200, such as physical interaction, verbal interaction, or non-contacting gestural interaction. As examples, the input devices 240 can include one or more of a keyboard, a mouse, a touch-sensitive panel with or without an associated display, a trackball, a stylus, a microphone, a camera, or a three-dimensional motion capture device.

The output devices 250 can include any type of device that is able to relay information in a manner that can be perceived by a user. As examples, the output devices 250 can include one or more of an LCD display screen, an LED display screen, a CRT display screen, a printer, an audio output device such as a speaker, or a haptic output device. In some implementations, the output devices 250 include a display screen and the input devices 240 include a touch sensitive panel that is integrated into the display screen to define a touch-sensitive display screen.

The bus 260 transfers signals and/or data between the components of the computing device 200. Although depicted as a single bus, it should be understood that multiple or varying types of buses could be utilized to interconnect the components of the computing device 200. The bus interface 270 can be any type of device that allows other devices, whether internal or external, to connect to the bus 260.

Figure 3:
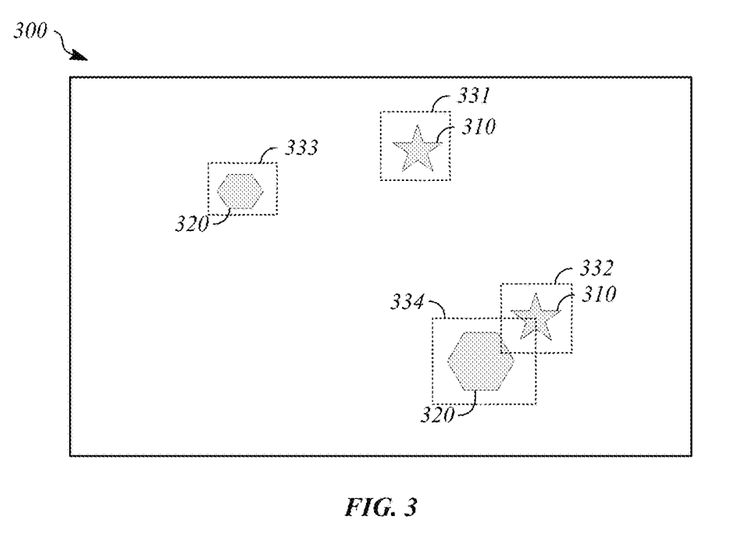
FIG. 3 is an illustration showing an image.

FIG. 3 shows an example of an image 300 that includes a plurality of features. The image 300 can be a raster image that includes a plurality of pixels.

In the image 300, each feature from a first group of features 310 corresponds to a first feature type and each feature from a second group of features 320 corresponds to a second feature type. In the illustrated example, the first group of features 310 includes two features and the first feature type is a star shape, while the second group of features 320 includes two features and the second feature type is a hexagonal shape. The number and types of features and groups of features can vary, however, and the specific numbers and types of features depicted in the illustrated example are chosen only for ease of description.

The first group of features 310 and the second group of features 320 can be identified using conventional feature extraction and classification techniques. Such feature extraction techniques can be implemented using a computing device such as the computing device 200, which would receive the image 310 as an input.

A window of interest is defined around each of the features in the image. For example a first window of interest 331 can be defined around a first feature from the first group of features 310, a second window of interest 332 can be defined around a second feature from the first group of features 310, a third window of interest 333 can be defined around a first feature from the second group of features 320, and a fourth window of interest 334 can be defined around a fourth feature from the fourth group of features 310. In some instances, windows of interest may overlap, as is the case with the second window of interest 332 and the fourth window of interest 334 in the illustrated example.

Figure 4:
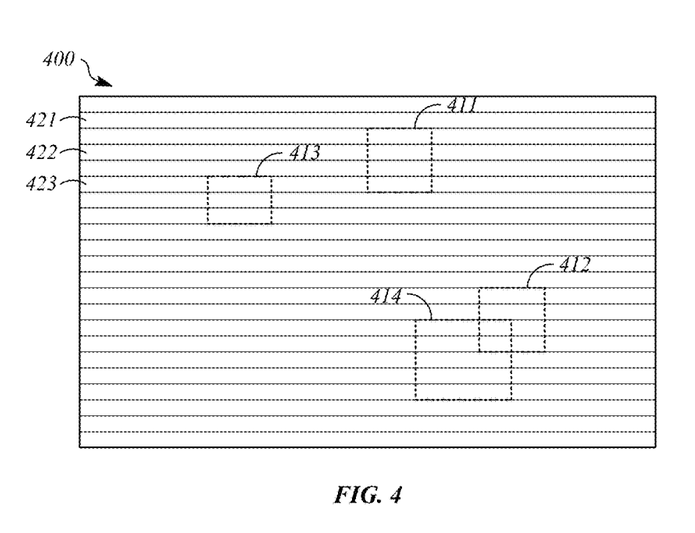
FIG. 4 is a schematic illustration showing an image sensor.

The windows of interest identified using the image 300 can be utilized to control the manner by which information is read from an image sensor, such as an image sensor 400 as shown in FIG. 4. Controlling the manner by which information is read from the image sensor 400 can be performed by setting a read mode for the image sensor 400. In one implementation, the read mode utilized for each of the windows of interest is dependent upon the feature type of the features within the respective window of interest. In the illustrated example, the first area 411 and the second area 412 correspond to the first feature type and are read with a first read mode, while the third area 413 and the fourth window of interest correspond to the second feature type and are read with a second read mode that is different than the first read mode.

Read modes for the image sensor 400 can vary in terms of characteristics such as resolution and rate, and read modes having different resolutions typically operate at different rates. For example, a highest possible resolution of the image sensor 400 can be obtained using a non-binned read mode in which the electrical charge accumulated by each of the image sensing elements of the image sensor is read out individually as an analog value. Thus, reading a portion of the image sensor 400 using the non-binned read mode generates a full-resolution image for that portion of the image sensor 400.

Lower resolutions can be read directly from the image sensor 400 using a binned read mode in which the electrical charges accumulated by multiple sensing elements are combined and read out as a single analog value. As examples, binned read modes can include a 2×2 binned read mode in which electrical charges from four sensing elements are combined and read out as a single analog value, and a 4×4 binned read mode in which electrical charges from sixteen sensing elements are combined and read out as a single analog value. These examples are not an exhaustive list of read modes, as other read modes can be utilized to read information from the image sensor 400.

By controlling the manner in which information is read from the image sensor 400, such as by reading different portions of the image sensor 400 with different read modes multiple images having differing characteristics can be generated simultaneously. For example, the simultaneously generated images can include an image based on information from the entire image sensor 400, as well as one or more additional images based on information from the image sensor 400 corresponding to one or more of the windows of interest.

The image sensor 400 can be configured as described with respect to the image sensor 116, and can be incorporated in a device such as the imaging device 110. The image sensor 400 includes an array of sensing elements (not shown in FIG. 4) that are arranged in rows and columns.

Using information that identifies the first window of interest 331, the second window of interest 332, the third window of interest 333, and the fourth window of interest 334, corresponding areas of the image sensor 400 can be identified. In an implementation where the image 300 was previously captured using the image sensor 400, the corresponding areas of the image sensor 400 are identified by mapping the spatial coordinates of the relevant window of interest to the image sensor 400, such that the identified portion of the image sensor 400 includes the sensing elements that captured the portion of the image 300 that is disposed within the corresponding window of interest. In the illustrated example a first area 411, a second area 412, a third area 413 and a fourth area 414 of the image sensor 400 are identified as corresponding to the first window of interest 331, the second window of interest 332, the third window of interest 333, and the fourth window of interest 334.

The image sensor 400 can be subdivided into a plurality of line groups, where each line group includes one or more rows of sensing elements. For example, each line group could include four rows of sensing elements, and therefore have a height that corresponds to four sensing elements and a width that corresponds to the full width of the image sensor 400. In the illustrated example, the line groups of the image sensor 400 include a first line group 421, a second line group 422, and a third line group 423.

The presence or absence of a window of interest within a line group can be utilized to select a read mode. A window of interest is considered to be present within a line group if at least some of the sensing elements of the image sensor 400 that are included in the window of interest are included in the line group. In the illustrated example, there are no windows of interest present in first line group 421, the first area 411 is present in the second line group 422, and the first area 411 and the third area 413 are both present in the third line group 423.

The read mode can be selected on a line group basis, with the entire line group being read using a single read mode. Where more than one read mode is applicable to a line group, a selection order can be defined to identify which read mode takes precedence when multiple are applicable. As an example, read modes having higher resolutions can take precedence over read modes having lower resolutions. Thus, the non-binned read mode can take precedence over the 2×2 binned read mode, and the 2×2 binned read mode can take precedence over the 4×4 binned read mode.

In the illustrated example, portions of the image sensor 400 that are not within one of the windows of interest correspond to a 4×4 binned read mode, portions of the image sensor 400 within the first area 411 and the second area 412 correspond to a 2×2 binned read mode, and portions of the image sensor 400 within the third area 413 and the fourth area 414 correspond to the non-binned read mode. Since the first line group 421 includes only portions of the image sensor 400 that are not within any window of interest, the first line group 421 is read with the 4×4 binned read mode. Since the second line group 422 includes portions of the image sensor 400 that are within the first area 411, the second line group 422 is read using the 2×2 binned read mode, which corresponds to the first window of interest and takes precedence over the 4×4 binned read mode. The third line group 423 includes portions of the image sensor 400 that are within the first area 411 and portions of the image sensor 400 that are within the third area 413 and is read using the non-binned read mode, which corresponds to the third area 413 and takes precedence over the binned read modes.

Figure 5:
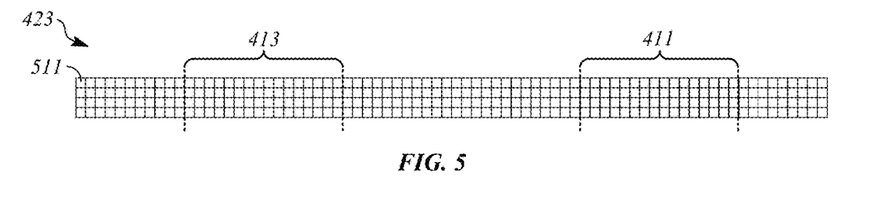
FIG. 5 is a schematic illustration showing a portion of a line group from the image sensor.

Reading of the third line group 423 will be explained further with reference to FIG. 5. The third line group 423 includes a plurality of sensing elements 511 in an array that has a height equal to four of the sensing elements 511 and a width equal to the full width of the image sensor 400. A portion of the sensing elements 511 are included within the third area 413, a portion of the sensing elements 511 are included within the first area 411, and the remainder of the sensing elements 511 are not included within any window of interest.

As previously noted, the third line group 423 is read using the non-binned read mode, analog values read from the image sensor 400 will include a respective value for each of the sensing elements 511 in the third line group 423. The analog data values are converted to digital values as previously explained with respect to the processing circuit 410. Of these digital values, the values that correspond to the sensing elements 511 within the third area 413 output in a manner that allows them to be used to define an image for the third area 413 when combined with values from other line groups. As examples, the values can be added to a memory space that corresponds to the third area 413 or the values can be added to a data stream. The values obtained from reading the third line group 423 are then downsampled to match the resolution of the 2×2 binned read mode. A portion of the downsampled values correspond to sensing elements 511 that are located within the first area 411, and these values are output in a manner that allows them to be used to define an image for the first area 411 when combined with values from other line groups, such as by adding the values to a corresponding memory space or data stream. The downsampled data values are further downsampled to match the resolution of the 4×4 binning mode, and these values are output in a manner that allows them to be used to define an image for the entire image sensor 400 when combined with values from other line groups, such as by adding the values to a corresponding memory space or data stream.

In implementations where the image sensor 400 allows individual addressing of the sensing elements 511 or blocks of the sensing elements 511, the manner of reading the third line group 423 can be modified by reading portions of the line group using different read modes instead of reading the entirety of the third line group 423 with a single read mode. In particular, the portion of the third line group 423 within the third area 413 can be read using the non-binned read mode, the portion within the first area 411 can be read using the 2×2 binned read mode, and the remaining portions of the third line group 423 can be read using the 4×4 binned read mode. Portions of the third line group 423 read using the non-binned read mode and/or the 2×2 binned read mode are downsampled and added to the data obtained using other read modes as needed.

Reading all of the line groups from the image sensor 400 will produce five images. One of the images corresponds to the entire area of the image sensor 400. The other images each correspond to a respective one of the first area 411, the second area 412, the third area 413, and the fourth area 414. Portions of each of these images can be stored in a memory space while the image sensor 400 is read, with each image being stored in a separate memory space. As an example, in the imaging device 110, these memory spaces can be defined in the memory 122. The images can then be transferred using an interface, such as the interface 124 of the imaging device 110. In one implementation, the images are transmitted to the computing device 200 using a single interface such as the interface 124 by interleaving the images. In another implementation, the interface 124 includes multiple separately addressable interfaces that can each be addressed by the computing device 200 as if it were a separate device. In this implementation, the images are each transmitted using a respective one of the separately addressable interfaces.

The systems and methods herein include combining image signals read using the non-binned read mode and one or more binned read modes to generate an image. Since binning operations combine the electrical charge from multiple sensing elements of the image sensor 400, portions that of the image sensor 400 are read using binned read modes can be exposed over a shorter integration time periods as compared to non-binned read modes or higher resolution binned read modes in order to achieve similar exposure characteristics for portions of the image sensor 400 that are read using different read modes. In an example where a first portion of the image sensor 400 is read using the 2×2 binned read mode and a second portion of the image sensor 400 is read using the non-binned read mode, the first portion can be exposed over a first integration time period that is shorter than a second integration time period over which the second portion is exposed. In one implementation, different integration times can be achieved using a rolling shutter.

Figure 6:
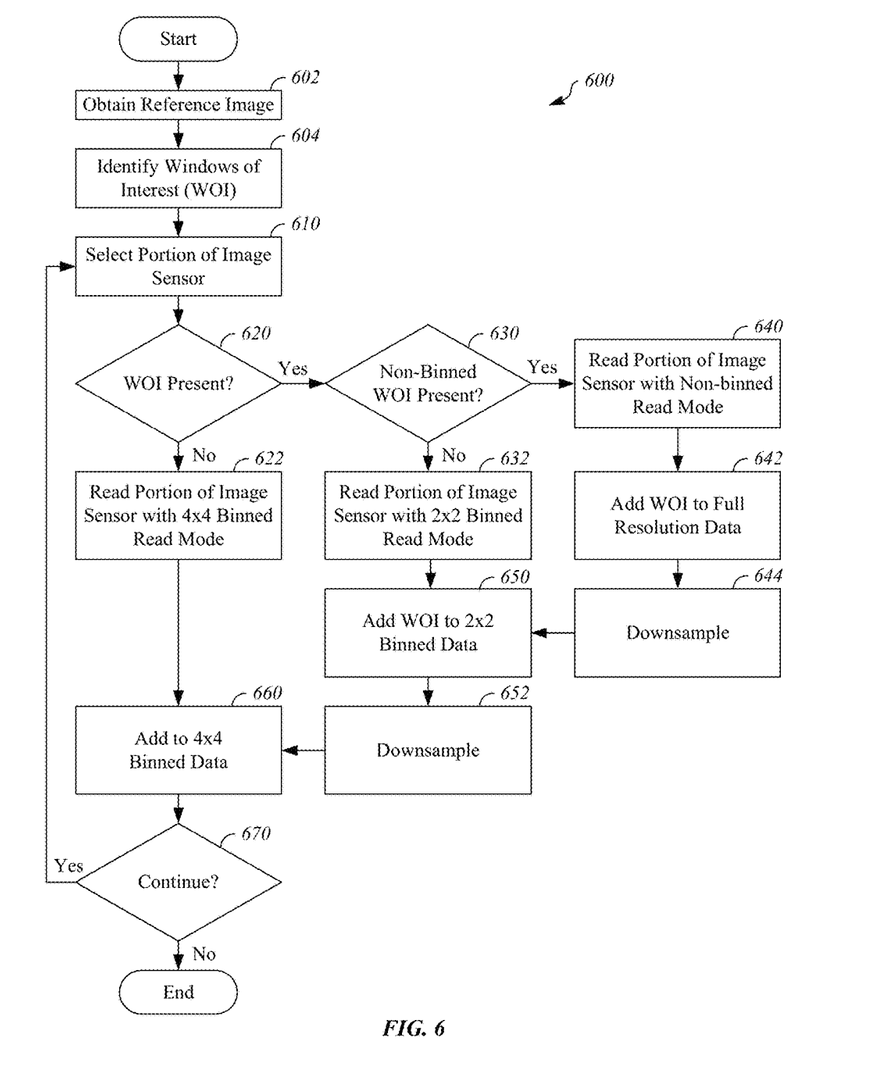
FIG. 6 is a flowchart showing a process for reading an image sensor.

FIG. 6 shows an example of a process 600 for reading information from an image sensor. The process 600 can be implemented in an imaging device, and will be described with respect to implementation using the imaging device 110. As an example, the process 600 can be implemented in the form instructions that are executed by the control circuit 126 and/or the processing circuit 120 of the imaging device 110.

Operation 602 includes obtaining a reference image. The reference image can be obtained by capturing it using the imaging device as previously described. In operation 604, one or more windows of interest (WOI) are identified, and information identifying the locations of the windows of interest is available to the device or devices that are implementing the process 600. The windows of interest can be identified, for example, based on features found in the reference image using a feature identification algorithm.

In this example, areas outside of one of the windows of interest correspond to a 4×4 binned read mode, and the window of interest include a 2×2 binned window of interest that corresponds to the 2×2 binned read mode and a non-binned window of interest that corresponds to the non-binned read mode.

A portion of the image sensor 116 is selected at operation 610. The portion selected can, for example, be the next available line group of the image sensor 116. The selection made at operation 610 can be in any form that causes a new portion of the image sensor 116 to be made available for reading, and does not require a selection between multiple options. The portion selected can be of any suitable area of the image sensor, such as one or more lines, one or more line groups, one or more sensing elements, or one or more blocks of sensing elements.

In operation 620, a determination is made as to whether a window of interest is present in the current portion of the image sensor 116. If no window of interest is present in the current portion of the image sensor 116, the process proceeds to operation 622, where image signals for the current portion of the image sensor 116 are read using the 4×4 binned read mode. If one or more windows of interest are present in the current portion of the image sensor, the process proceeds to operation 630.

In operation 630, a determination is made as to whether one of the non-binned windows of interest is present in the current portion of the image sensor 116. If no non-binned window of interest is present in the current portion of the image sensor 116, the process proceeds to operation 632, where image signals for the current portion of the image sensor are read using the 2×2 binned read mode. If one or more non-binned windows of interest are present in the current portion of the image sensor, the process proceeds to operation 640.

In operation 640, image signals for the current portion of the image sensor are read using the non-binned read mode. In operation 642, the image signals read out from the image sensor in operation 640 are analyzed, and the portion of the image signals from sensing elements that fall within one of the non-binned windows of interest are added to full resolution image data corresponding to the respective window of interest. As one example, the image signals can be added to a memory space that corresponds to the window of interest, such as a memory space at the memory 122 of the imaging device 110. As another example, the image signals can be added to a data stream. Thus, a portion of an image is defined in the memory space or data stream.

In operation 644, the image signals read out from the image sensor 116 at operation 640 are downsampled. The image signals can be downsampled to a resolution equivalent to the resolution that would result from reading the image sensor 116 using the 2×2 binned read mode. This can be accomplished by performing a 2×2 digital bin operation with respect to the full resolution image signals read at operation 640. The process then proceeds to operation 650.

Operation 650 occurs after either of operation 632 or operation 644, and utilizes image signals obtained either at operation 632 by reading the image sensor 116 using the 2×2 binned read mode or the downsampled image signals generated at operation 644. In operation 650, the portion of the image signals from sensing elements that fall within one of the 2×2 binned windows of interest are added to 2×2 binned data corresponding to the respective window of interest, such as in a memory space or a data stream. Thus, a portion of an image is defined in the memory space or data stream.

In operation 652, the image signals utilized at operation 650 are downsampled. The image signals can be downsampled to a resolution equivalent to the resolution that would result from reading the image sensor 116 using the 4×4 binned read mode. This can be accomplished by performing a 2×2 digital bin operation with respect to the image signals utilized at operation 652. The process then proceeds to operation 660.

Operation 660 occurs after either of operation 622 or operation 654, and utilizes image signals obtained either at operation 622 by reading the image sensor 116 using the 4×4 binned read mode or the downsampled image signals generated at operation 654. In operation 650, the portion of the image signals from sensing elements that fall within one of the 4×4 binned windows of interest are added to 4×4 binned data corresponding to the respective window of interest, such as in a memory space or a data stream. Thus, a portion of an image is defined in the memory space or data stream.

The process then proceeds to operation 670, where a determination is made as to whether further portions of the image sensor 116 remain that need to be read. If the process is to continue by reading a further portion of the image sensor 116, the process returns to operation 610. Otherwise, the process ends.

It will be appreciated from the foregoing that the process 600, when applied to the image sensor 116 and using one or more windows of interest, will result in reading the image sensor using multiple read modes. In one example, application of the process 600 when at least one non-binned window of interest is present will result in receiving a first group of image signals from a first portion of the plurality of sensing elements of the image sensor 116 using at least a first binned read mode such as the 2×2 binned read mode or the 4×4 binned read mode; receiving a second group of image signals from a second portion of the plurality of sensing elements using a non-binned read mode; generating a first image based on at least the first group of image signals and the second group of image signals; and generating a second image based on the second group of image signals. In another example, application of the process 600 when portions outside of windows of interest correspond to a first binned read mode, at least one window of interest corresponds to a second binned read mode, and at least one window of interest corresponds to the non-binned read mode will result in receiving a first group of image signals from a first portion of the plurality of sensing elements of the image sensor 116 using a first binned read mode; receiving a second group of image signals from a second portion of the plurality of sensing elements using a second binned read mode; receiving a third group of image signals from a third portion of the plurality of sensing elements using a non-binned read mode; generating a first image based on at least the first group of image signals, the second group of image signals, and the third group of image signals; generating a second image based on the second group of image signals and the third group of image signals; and generating a third image based on the third group of image signals.

Figure 7:
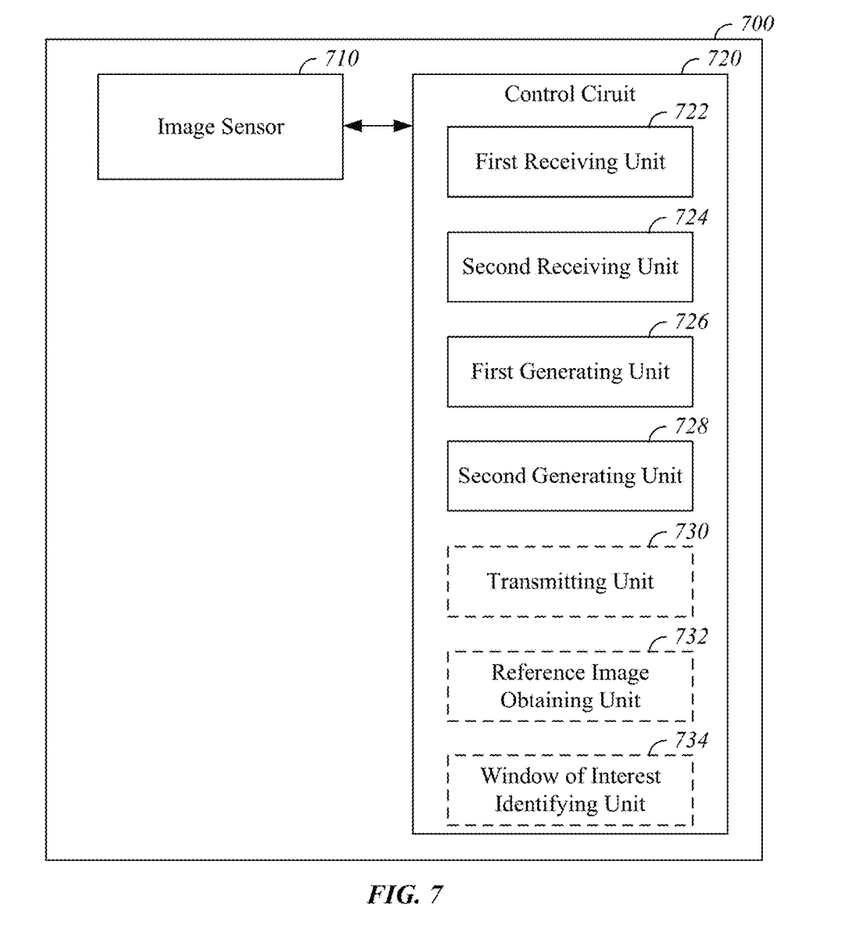
FIG. 7 is a functional block diagram showing an apparatus.

FIG. 7 is a functional block diagram showing an apparatus 700. The apparatus 700 includes an image sensor 710 having a plurality of sensing elements and a control circuit 720. The control circuit 720 includes a first receiving unit 722 to receive a first group of image signals from a first portion of the plurality of sensing elements using at least a first binned read mode; a second receiving unit 724 to receive a second group of image signals from a second portion of the plurality of sensing elements using a non-binned read mode; a first generating unit 726 to generate a first image based on at least the first group of image signals and the second group of image signals; and a second generating unit 728 to generate a second image based on the second group of image signals.

The control circuit 720 may also include a transmitting unit 730. In some implementations, the transmitting unit 730 is operable to transmit the first image and the second image to a computing device over a single interface by interleaving the first image and the second image. In some implementations, the transmitting unit 730 is operable to transmit the first image via a first interface and to transmit the second image via a second interface.

The control circuit 720 may also include a reference image obtaining unit 732 to obtain a reference image. The control circuit 720 may also include a window of interest identifying unit 734 to identify a window of interest.

Persons of skill in the art will appreciate that operation of the units and modules of FIG. 7 can be further understood with reference to corresponding operations in the process 600 of FIG. 6, and therefore, previously explained details are not repeated here.

It is also apparent for those skilled in the art that the units and modules of FIG. 7 can be implemented in a device, such as the imaging device 110 of FIG. 1, in the form of software, hardware and/or combinations of software and hardware. Units described as separate components may or may not be physically separate. On the contrary, units may be integrated into a single physical component or may be separate physical components. Furthermore, it should be understood that the units, modules, and devices described herein may be implemented in form of software, hardware known or developed in the future, and/or the combination of such software and hardware.

What is claimed is:

1. A method for capturing an image from an image sensor having a plurality of sensing elements, comprising:
    receiving a first group of image signals from a first portion of the plurality of sensing elements using at least a first binned read mode;
    receiving a second group of image signals from a second portion of the plurality of sensing elements using a non-binned read mode;
    generating a first image by combining the first group of image signals with a downsampled version of the second group of image signals; and
    generating a second image based on the second group of image signals.

2. The method of claim 1, wherein the first binned read mode is a 2×2 binned read mode.

3. The method of claim 1, wherein the first binned read mode is a 4×4 binned read mode.

4. The method of claim 1, wherein the second image is a full-resolution image.

5. The method of claim 1, further comprising:
    storing the first image in a first memory space; and
    storing the second image in a second memory space.

6. The method of claim 1, further comprising:
    transmitting the first image via a first interface; and
    transmitting the second image via a second interface.

7. The method of claim 1, further comprising:
    identifying a window of interest, wherein at least part of the window of interest is located in the second portion of the plurality of sensing elements.

8. The method of claim 7, wherein the window of interest is identified based on presence of one or more features within the window of interest.

9. The method of claim 8, further comprising:
    obtaining a reference image, wherein presence of the one or more features within the window of interest is identified using the reference image.

10. The method of claim 1, wherein the image sensor includes a plurality of line groups, the first portion includes one or more line groups from the plurality of line groups and the second portion includes one or more line groups from the plurality of line groups.

11. The method of claim 1, further comprising:
    transmitting the first image and the second image to a computing device over a single interface by interleaving the first image and the second image.

12. The method of claim 1, further comprising:
    exposing the first portion over a first integration time period; and
    exposing the second portion over a second integration time period, wherein the first integration time period is shorter than the second integration time period.

13. A method for capturing an image from an image sensor having a plurality of sensing elements, comprising:
    receiving a first group of image signals from a first portion of the plurality of sensing elements using at least a first binned read mode;
    receiving a second group of image signals from a second portion of the plurality of sensing elements using a non-binned read mode;
    generating a first image based on at least the first group of image signals and the second group of image signals;
    generating a second image based on the second group of image signals; and
    transmitting the first image and the second image to a computing device over a single interface by interleaving the first image and the second image.

14. A method for capturing an image from an image sensor having a plurality of sensing elements, comprising:
    receiving a first group of image signals from a first portion of the plurality of sensing elements using at least a first binned read mode;

receiving a second group of image signals from a second portion of the plurality of sensing elements using a non-binned read mode;

generating a first image based on at least the first group of image signals and the second group of image signals;

generating a second image based on the second group of image signals;

exposing the first portion over a first integration time period; and exposing the second portion over a second integration time period, wherein the first integration time period is shorter than the second integration time period.

15. An apparatus, comprising:

an image sensor having a plurality of sensing elements;

a memory; and a control circuit that includes instructions, wherein the instructions, when executed, cause the control circuit to:

receive a first group of image signals from a first portion of the plurality of sensing elements using at least a first binned read mode, receive a second group of image signals from a second portion of the plurality of sensing elements using a non-binned read mode, generate a first image by combining the first group of image signals with a downsampled version of the second group of image signals, and generate a second image based on the second group of image signals.

16. A method for controlling an image sensor having a plurality of sensing elements, comprising:

obtaining a reference image using the image sensor;

identifying a window of interest using the reference image based on presence of at least one feature;

identifying a first portion of the image sensor that does not include the window of interest and a second portion of the image sensor that includes the window of interest;

reading a first group of image signals from the first portion of the image sensor using at least a first binned read mode;

reading a second group of image signals from a second portion of the image sensor using a non-binned read mode;

generating a first image based on at least the first group of image signals and the second group of image signals by combining the first group of image signals with a downsampled version of the second group of image signals; and generating a second image that corresponds to the window of interest based on the second group of image signals.

17. The method of claim 16, wherein the first binned read mode is at least one of a 4×4 binned read mode or a 2×2 binned read mode.

18. The method of claim 16, wherein the image sensor includes a plurality of line groups, the first portion includes one or more line groups from the plurality of line groups and the second portion includes one or more line groups from the plurality of line groups.

19. The method of claim 16, further comprising:

transmitting the first image and the second image to a computing device over a single interface by interleaving the first image and the second image.

20. The method of claim 16, further comprising:

exposing the first portion over a first integration time period; and exposing the second portion over a second integration time period, wherein the first integration time period is shorter than the second integration time period.

* * * * *